May 7, 1929.     B. M. SCHAUMAN     1,711,695
VEHICLE BRAKE OPERATING MEANS
Filed Aug. 14, 1926     4 Sheets-Sheet 2

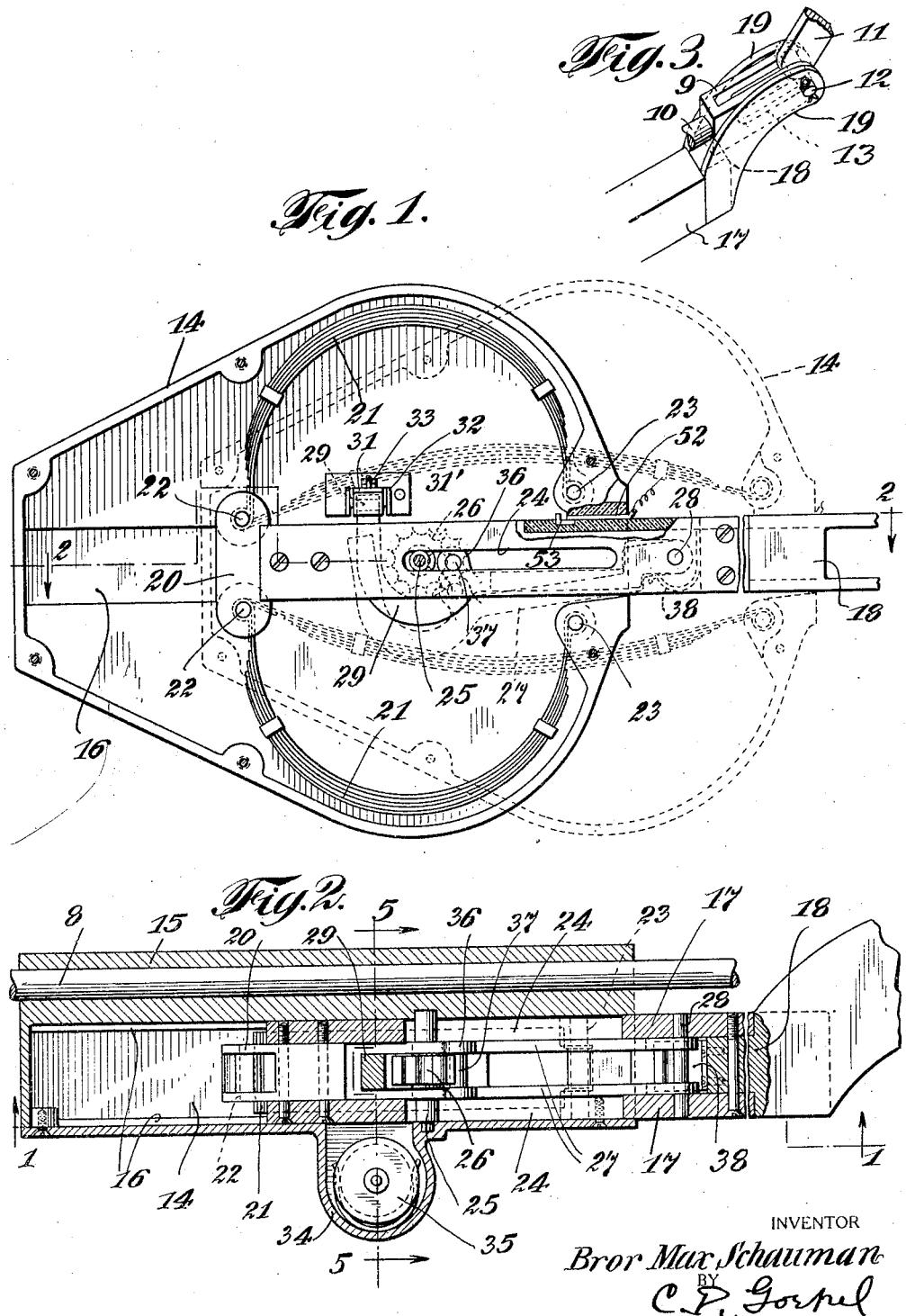

TO IGNITION

INVENTOR
Bror Max Schauman
BY C. P. Gospel
his ATTORNEY

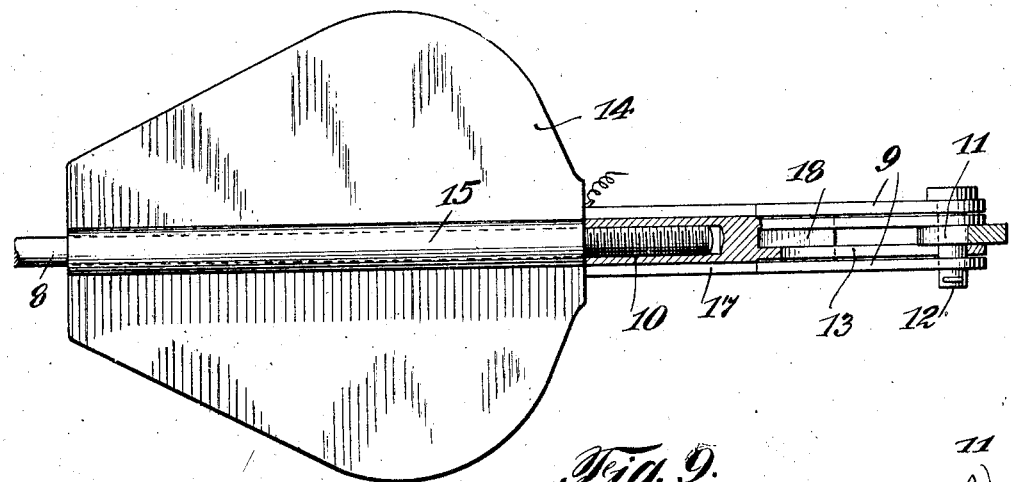
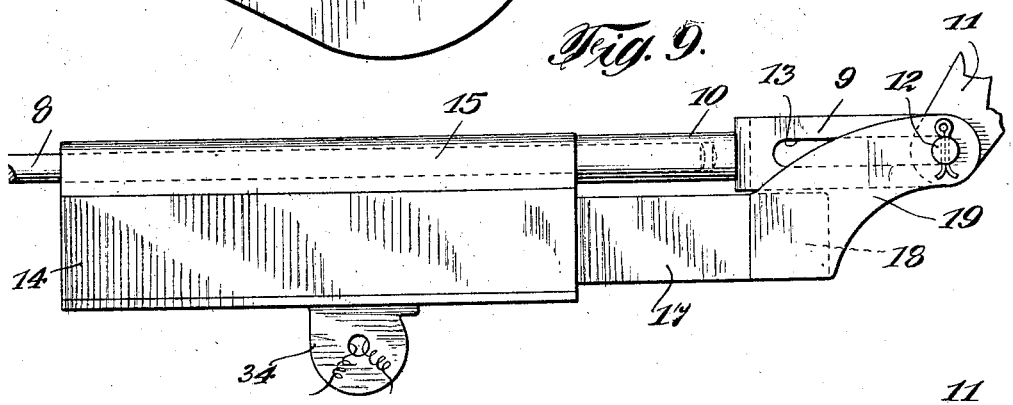
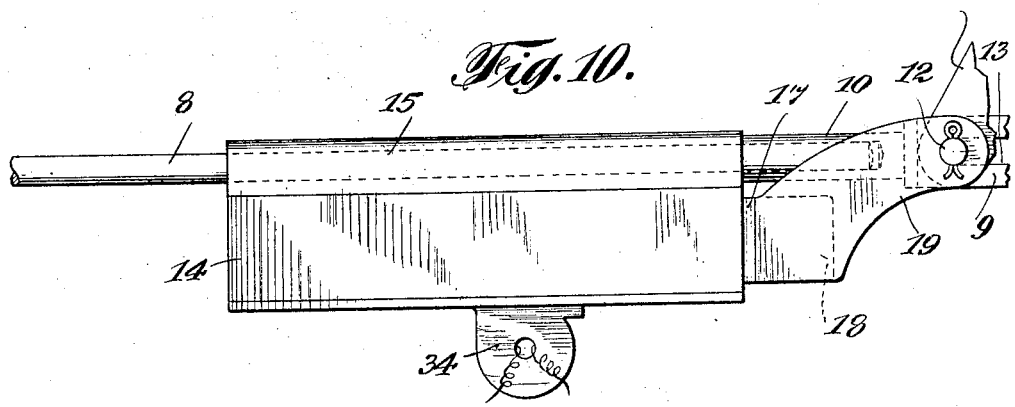

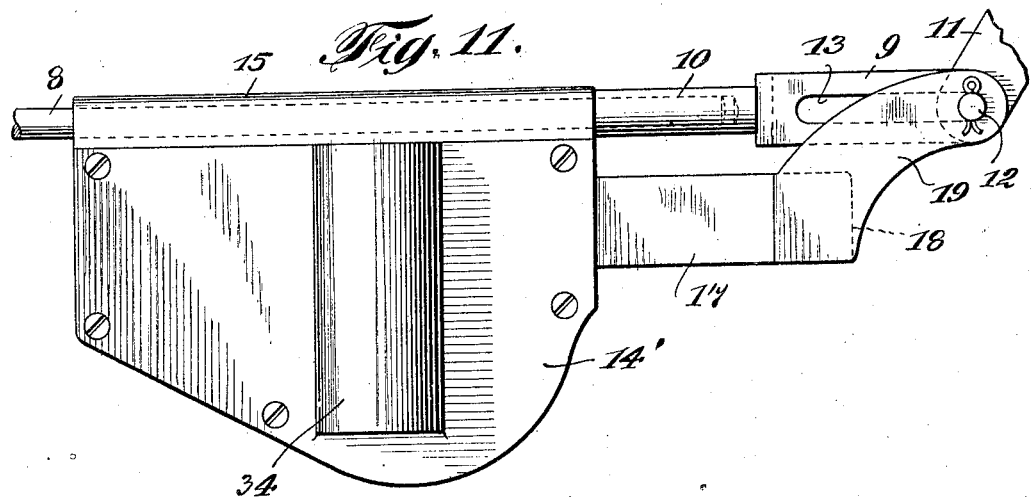
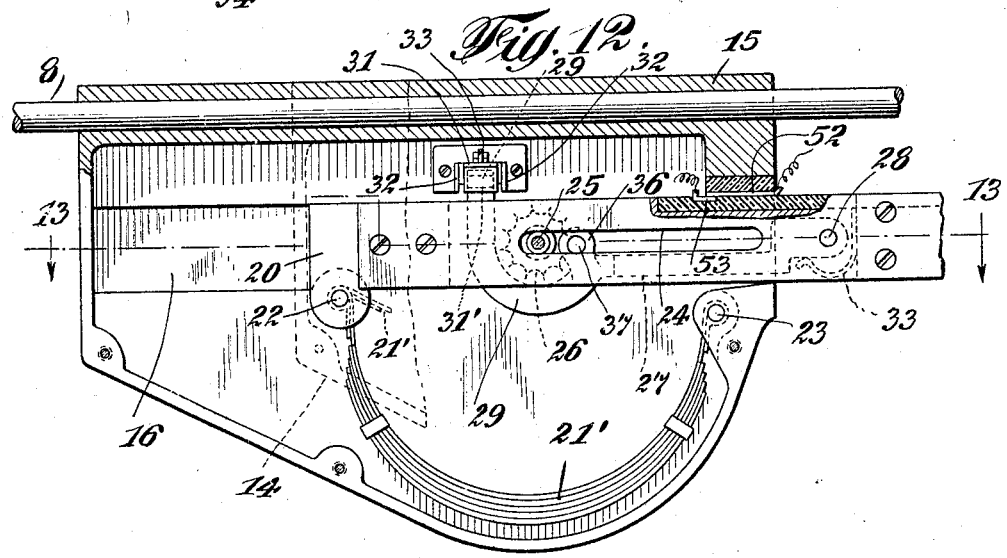
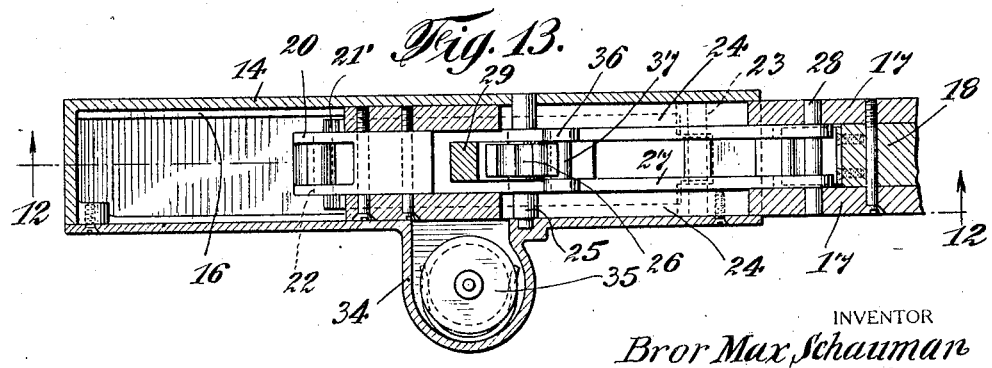

Patented May 7, 1929.

1,711,695

UNITED STATES PATENT OFFICE.

BROR MAX SCHAUMAN, OF NEW YORK, N. Y., ASSIGNOR, BY MESNE ASSIGNMENTS, TO AUTOMATIC CAR STOP CORPORATION, A CORPORATION OF DELAWARE.

VEHICLE BRAKE-OPERATING MEANS.

Application filed August 14, 1926. Serial No. 129,123.

This invention relates to vehicle brake operating means, and has for its primary object to provide a relatively simple and positively acting mechanism for instantaneously applying the brakes of the vehicle in cases of emergency.

It is another object of the invention to provide electrically actuated means for controlling the operation of said brake applying mechanism, the circuit of which may be closed either through a suitable push button or other switch or automatically in case of collision.

Briefly stated, the invention in its essential features includes relatively movable members, one of which is connected with the hand brake applying lever and the other of which is suitably connected with the brake together with spring means connecting said members and a latch device for holding said members against relative movement and the action of said spring means whereby they may be operated as a unit from the hand lever under normal conditions. A solenoid, or other electrical means is operated upon closing a suitable switch to actuate said latch device, thereby releasing the spring means and effecting the application of the brakes independently of the hand lever. I may also provide suitable means for simultaneously breaking the ignition circuit of the engine of the motor vehicle.

With the above and other objects in view, the invention consists in the improved brake operating means for motor vehicles, and in the form, construction and relative arrangement of its several parts as will be hereinafter more fully described, illustrated in the accompanying drawings, and subsequently incorporated in the subjoined claims.

In the drawings, wherein I have disclosed several simple and practical embodiments of the invention, and in which similar reference characters designate corresponding parts throughout the several views,—

Figure 1 is a plan view of one form of my invention, certain parts being omitted and others shown in section, the normal condition thereof being illustrated in full lines, and the relative positions of the parts after the brakes are applied being shown in dotted lines;

Fig. 2 is a longitudinal horizontal sectional view taken substantially on the line 2—2 of Fig. 1;

Fig. 3 is a detail perspective view showing the connection between certain parts of the mechanism and the hand brake lever;

Fig. 8 is a plan view showing the connecting means between the brake rod and the hand lever partly in section;

Figs. 9 and 10 are enlarged side elevations showing the relative positions of the parts before and after the brakes are applied;

Fig. 11 is a side elevation of a slightly modified embodiment of the invention;

Fig. 12 is a vertical sectional view thereof taken substantially on the line 12—12 of Fig. 13, and Fig. 13 is a horizontal sectional view taken substantially on the line 13—13 of Fig. 12.

Figure 4:
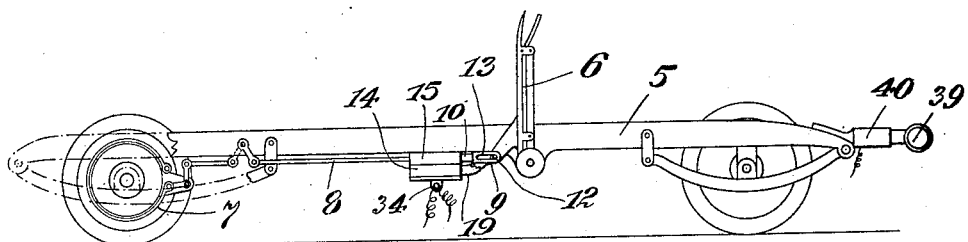
Fig. 4 is a side elevation of the chassis of a motor vehicle having my invention applied thereto.

Referring now more particularly to Figs. 1 to 10 inclusive of the drawings, my device as therein shown is adapted to be arranged in a general horizontal plane beneath the chassis of the motor vehicle. In Fig. 4 of the drawings, I have illustrated more or less diagrammatic such a vehicle chassis 5 and the manually operable brake lever 6. The rear wheels of the vehicle are provided with any usual type of friction brake, one of which is indicated at 7 and is operatively connected by any suitable means with the lever 6. As herein shown this operating means for the wheel brakes includes a rod 8 to the forward end of which the forked member 9 is suitably connected. Thus, this member may be provided with an internally threaded tubular extension or sleeve 10 to receive the threaded end of the rod 8. The forked or bifurcated member 9 straddles an arm 11 projecting rearwardly from the lower end of the brake lever 6, said arm having a transversely disposed pin 12 fixed therein, which is loosely engaged through slots 13 in the spaced arms of the member 9.

A casing 14 is provided upon its upper wall with a rib 15 having a longitudinal bore loosely receiving the brake connecting rod 8. The upper and lower walls of the casing are provided upon their inner faces with the guideways 16 in which bars 17 are slidably engaged, said bars extending outwardly through one end of the casing and being rigidly fixed to the member 18 which is provided with spaced arms 19 between which the member 9 is positioned, said arms at their extremities being pivotally connected with the arm 11 of the brake lever by means of the pin 12.

The other or inner ends of the bars 17 are rigidly fixed to a head 20 positioned between the same. Laminated leaf springs 21 are pivotally attached at one of their ends to the head 20 as shown at 22 while the other ends of said springs are pivotally attached to one end of the casing 14 as shown at 23.

Each of the bars 17 is provided with a longitudinally extending slot 24 through which the transverse pin or axis 25 mounted in opposite side walls of the casing 14 extends. On this pin, and between the bars 17 the peripherally corrugated or toothed wheel 26 is loosely engaged.

Between the ends of the bars 17 which project externally of the casing 14 a pair of levers 27 are pivoted on the transverse pin 28. These levers at their other or inner ends are integrally or otherwise connected by a bar 29 having a curved portion extending around the toothed disc or wheel 26 and a straight end portion projecting transversely between the bars 17 beyond one side thereof and terminating in an offset tooth or lug 30. With this lug a latch lever 31 is adapted to engage, said lever being pivotally mounted between the bracket arms 32 fixed to one wall of the casing 14 and yieldingly held in engagement with the tooth 30 by means of a suitable spring shown at 33. This lever projects into the housing extension 34 on one side of the casing 14 in opposed relation to the core of a solenoid 35 contained in said housing. In the latched position of the bar 29, the tooth or lip 30 on the end of said bar engages in a notch or recess 31' in the pivoted end of lever 31, thereby effectively preventing longitudinal shifting movement of the casing 14 under the action of the springs 21. At the opposite side of the wheel or disc 26 the connecting member 29 between levers 27 is provided with spaced ears 36 in which the pin 37 is fixed, said pin being seated in one of the notches or recesses of the wheel 26 and having its axial center positioned out of alignment with the axial center of the wheel 26 and the longitudinal center line of the bars 17. A suitable spring 38 is engaged with the levers 27 adjacent their pivoted ends and normally urges said levers and the part 29 to the positions shown in full lines in Fig. 1 of the drawings wherein the terminal tooth 30 of the part 29 is engaged by the latch member 31. In such normal position of the parts, the casing 14 and the bars 17 are held against relative movement with the leaf springs 21 bowed to substantially semi-circular form as shown in full lines in the drawings, one end of the casing 14 being in abutting contact with the end of sleeve 10 on the member 9. It will thus be apparent that when the hand brake lever 6 is actuated, the several parts will be moved as a unit with the rod 8 to apply or release the brakes in the ordinary operation of the vehicle.

Figure 5:
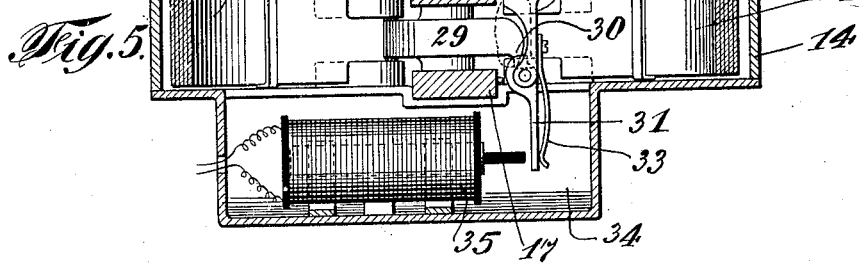
Fig. 5 is a transverse sectional view taken substantially on the line 5—5 of Fig. 2.
Figure 6:
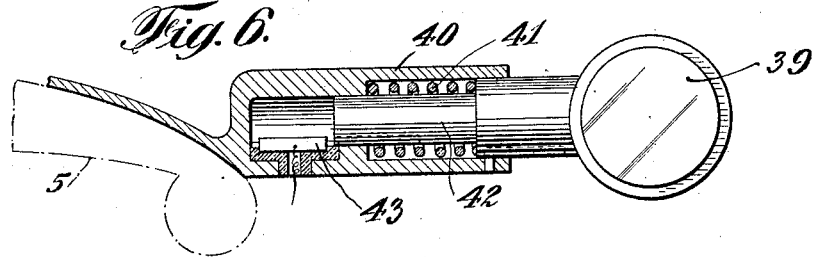
Fig. 6 is a detail section of the bumper mounting illustrating an automatic circuit closing means for the latch operating solenoid.
Figure 7:
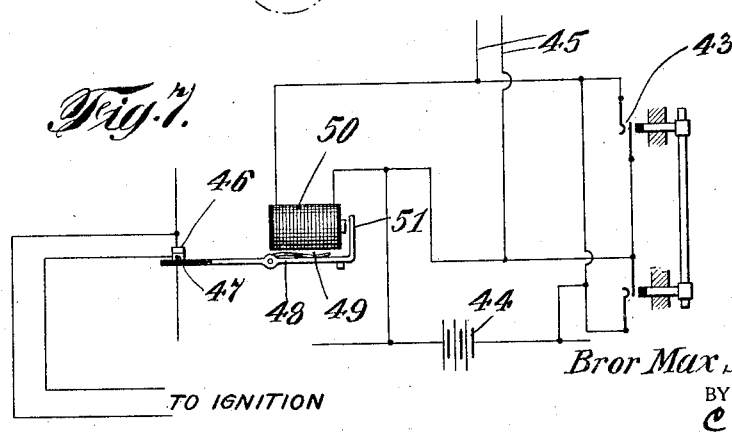
Fig. 7 is a diagrammatic view of the circuit closing means and also showing means for breaking the ignition circuit of the motor.

The solenoid 35 is included in a suitable circuit hereafter referred to, and when this circuit is closed and the solenoid energized, the projection of the solenoid core causes the latch member 31 to be actuated as will be seen from reference to Fig. 5 of the drawings, thus releasing the bar 29 and levers 27. Since the bars 17 have a relatively fixed connection with the hand lever 6, the casing 14 will be moved longitudinally with respect to said bars by the expansion of the springs 21 to substantially the position shown in dotted lines in Fig. 1 of the drawings. Obviously, in this relative sliding movement of the casing 14, the operating rod connection 8 with the wheel brakes is drawn forwardly, said rod being moved relative to the hand lever 6 by reason of the slotted connection 9 between said rod and the arm 11 of the lever, as will be noted from a comparison of Figs. Figs. 9 and 10 of the drawings. Also, in this movement of the casing, the wheel or disc 26 bearing against the pin 37 is rotated, and the levers 27 and bar 29 are pivotally moved against the action of spring 38 to substantially the dotted line positions as shown in the drawing. Thus, the wheel brakes will be instantaneously applied to bring the vehicle to a stop.

In order to release the brakes, the lever 6 is first moved in the direction for applying the brakes so that the bars 17 will be drawn out from the end of the casing 14 to again put the springs 21 under tension and reengage the toothed end of bar 29 with the latch member 31. It will be understood that in this relative movement between the casing 14 and bars 17, the pin 37 is maintained in bearing engagement with the toothed wheel or disc 26 by the spring 38. Upon then returning the brake lever 6 to its normal position, the bars 17 and casing 14 move together as a unit in a rearward direction, thereby permitting the brakes to expand to released position.

In certain makes of motor vehicles where there may not be sufficient space within which to horizontally position the casing 14, I may employ the modified construction illustrated in Figs. 11 to 13 of the drawings wherein the casing 14' is positioned in a vertical plane and contains a single spring 21' connected with said casing and the bars 17 connected with the manually operable brake lever. The construction and arrangement of the other parts of the device in this alternative form thereof is the same as that above described, and said device operates in a similar manner.

The solenoid 35 may be wired in the storage battery circuit of the vehicle and a suitable emergency switch provided to close the circuit and energize said solenoid. However, in the accompanying drawings, I have shown in Figs. 6 and 7 of the drawings, a means for automatically closing the circuit in the event of a collision to effect the application of the brakes, and to also simultaneously break the the ignition circuit of the motor vehicle engine. As illustrated, the bumper 39 is mounted at its opposite ends in the hollow guide brackets 40, said brackets housing the coil springs 41 surrounding the rods 42 on the ends of the bumper which are slidably engaged in said brackets. These springs normally urge the bumper forwardly to its normal position and upon impact against the bumper, the rods 42 cooperate with suitable circuit closers 43 to close a circuit through the battery indicated at 44, in which circuit the solenoid 35 is connected by the conductors shown at 45 in Fig. 7 of the drawings. Thus, this solenoid will be energized and its core projected to move the latch lever 31 to released position as above described whereby the vehicle wheel brakes are applied.

In the ignition circuit of the motor stationary and movable switch contacts 46 and 47 respectively, are interposed, said movable contact being carried by the pivoted lever 48 with which a suitable spring 49 coacts to normally hold the contact 47 in engagement with contact 46 and maintain a closed circuit. An electromagnet 50 is connected in the circuit of battery 44 so that when said circuit is closed to energize the solenoid upon impact against the bumper 39, the electromagnet 50 is also energized to attract the armature 51 on one end of lever 48 and thereby move said lever to disengage the contact 47 from the contact 46, thus breaking the ignition circuit. As shown in Fig. 1 of the drawings, as an alternative for this circuit breaking switch, I may provide the contact strips 52 and 53 respectively, fixed to casing 14 and the bars 17 and properly insulated therefrom and connected with the opposite sides of the ignition circuit by suitable conductors. Normally, these two contact strips are engaged as shown in the drawings to maintain the circuit closed, and in the movement of the casing 14 relative to bars 17 when the brakes are applied, said strips will be disengaged, to thus break the ignition circuit.

From the foregoing description considered in connection with the accompanying drawings, it will be seen that I have devised a relatively simple mechanism which may be readily applied to various types of motor vehicles now in general use without necessitating any material alterations therein, and which, in cases of emergency will operate in a positive and reliable manner to apply the brakes independently of the usual manually operable brake lever. At the same time, this automatically acting mechanism does not in any way interfere with the usual normal operation of the brakes by the manipulation of said lever. Also, it will be noted that this mechanism as a whole consists of relatively few parts which are of simple construction so that it can be produced at comparatively low manufacturing cost.

While I have herein shown and described several desirable and practical embodiments of the invention it is to be understood that the essential features thereof might also be incorporated in various other alternative mechanical structures, and I accordingly reserve the privilege of resorting to all such legitimate changes therein as may be fairly embodied within the spirit and scope of the invention as claimed.

I claim:

1. In combination with brake operating means including a manually operable lever, emergency means for applying the brake including relatively movable members each connected with a part of the brake operating means, one of said members consisting of a casing partially enclosing the other member, spring means within said casing operatively connected thereto and to the enclosed member to move one of said members relative to the other and actuate the brake operating means independently of said lever to apply the brake, and a releasable latch device normally holding said members against relative movement under the action of said spring means and for movement as a unit when the brake operating means is actuated by said lever.

2. In combination with brake operating means including a manually operable lever, emergency means for applying the brake including relatively movable members each connected with a part of the brake operating means, one of said members consisting of a casing partially enclosing the other member, spring means within said casing operatively connected thereto and to the enclosed member to move one of said members relative to the other and actuate the brake operating means independently of said lever to apply the brake, a releasable latch device normally holding said members against relative movement under the action of said spring means and for movement as a unit when the brake operating means is actuated by said lever, said latch device including a rotatably supported pinion on one of said members, an element pivotally mounted on the other member and carrying a pin having means yieldingly coacting with said element to hold the pin in engagement with the teeth of said pinion, and a pivoted latch lever carried by said first named member to coact with said element and normally hold the same against pivotal movement.

3. In combination with brake operating means including a manually operable lever, emergency means for applying the brake including relatively movable members each connected with a part of the brake operating means, one of said members consisting of a casing partially enclosing the other member, spring means within said casing operatively connected thereto and to the enclosed member to move one of said members relative to the other and actuate the brake operating means independently of said lever to apply the brake, a releasable latch device normally holding said members against relative movement under the action of said spring means and for movement as a unit when the brake operating means is actuated by said lever, said latch device including a rotatably supported pinion on one of said members, an element pivotally mounted on the other member and carrying a pin having means yieldingly coacting with said element to hold the pin in engagement with the teeth of said pinion, a pivoted latch lever carried by said first named member to coact with said element and normally hold the same against pivotal movement, and a solenoid having its core opposed to one end of the latch lever to actuate the latter.

4. In combination with brake operating means including a manually operable lever, emergency means for applying the brake including a member directly connected with said lever, a casing in which said member is slidably mounted, connecting means between said casing and a part of the brake operating means connected with said lever for movement relative thereto, spring means housed within the casing connected with said casing and said member to move the casing relative to said member and actuate the brake operating means independently of said lever to apply the brake, and electrically controlled means releasably connecting said casing and the member with each other for movement as a unit when the brake operating means is actuated by said lever.

5. In combination with a motor vehicle having brake operating means including a manually operable lever, emergency means for applying the brake including a member directly connected with said lever, a casing in which said member is slidably mounted, connecting means between said casing and a part of the brake operating means connected with said lever for movement relative thereto, spring means housed within the casing connected with said casing and said member to move the casing relative to said member and actuate the brake operating means independently of said lever to apply the brake, electrically controlled means releasably connecting said casing and the member with each other for movement as a unit when the brake operating means is actuated by said lever, a circuit for said electrical control means, a circuit closer actuated by a collision impact receiving part of the vehicle to close said circuit, a switch interposed in the motor ignition circuit of the vehicle, and means energized upon the closing of said first named circuit to open said switch and break the ignition circuit.

6. In combination with brake operating means including a manually operable lever, emergency means for applying the brake including relatively movable members each connected with a part of the brake operating means, one of said members consisting of a casing partially enclosing the other member, spring means within said casing operatively connected thereto and to the enclosed member to move one of said members relative to the other and actuate the brake operating means independently of said lever to apply the brake, a rotatable part carried by one of said members, a pivoted element on the other member having means engaging said part at one side of its axis, and a pivoted latch lever carried by said first named member to coact with said element and normally hold the same against pivotal movement.

7. In combination with brake operating means including a manually operable lever, emergency means for applying the brake including relatively movable members each connected with a part of the brake operating means, one of said members consisting of a casing partially enclosing the other member, spring means within said casing operatively connected thereto and to the enclosed member to move one of said members relative to the other and actuate the brake operating means independently of said lever to apply the brake, a rotatable part carried by one of said members, a pivoted element on the other member having means engaging said part at one side of its axis, a pivoted latch lever carried by said first named member to coact with said element and normally hold the same against pivotal movement, and a solenoid having its core opposed to one end of the latch lever to actuate the latter.

In testimony that I claim the foregoing as my invention, I have signed my name hereto.

BROR MAX SCHAUMAN.